Oct. 10, 1961 H. A. KEMBLE 3,003,825
FLUID PRESSURE CONTROL VALVE MECHANISM
Filed May 11, 1959 3 Sheets-Sheet 1
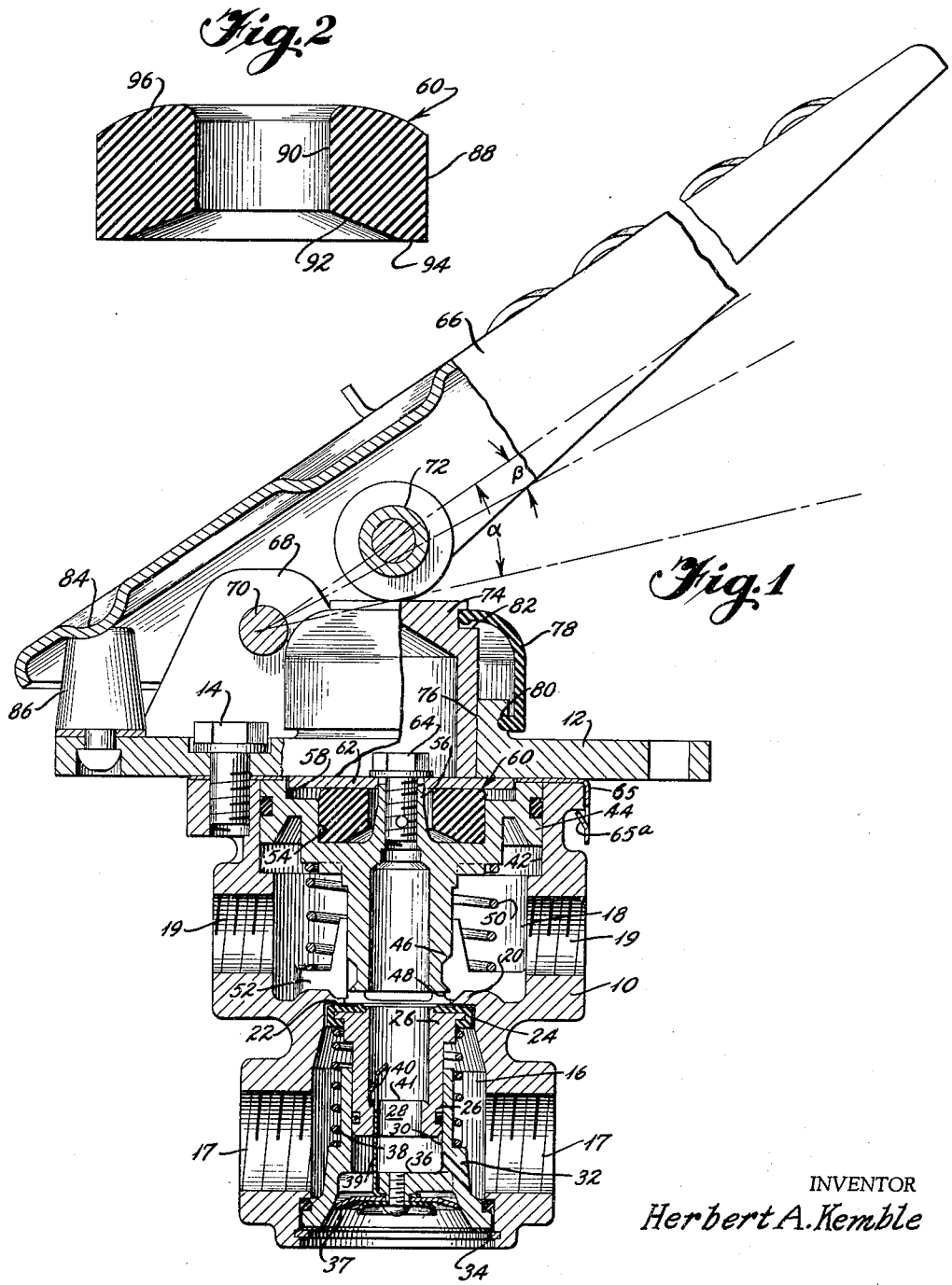
INVENTOR
*Herbert A. Kemble*
BY
*Scrivener & Parker*
ATTORNEYS

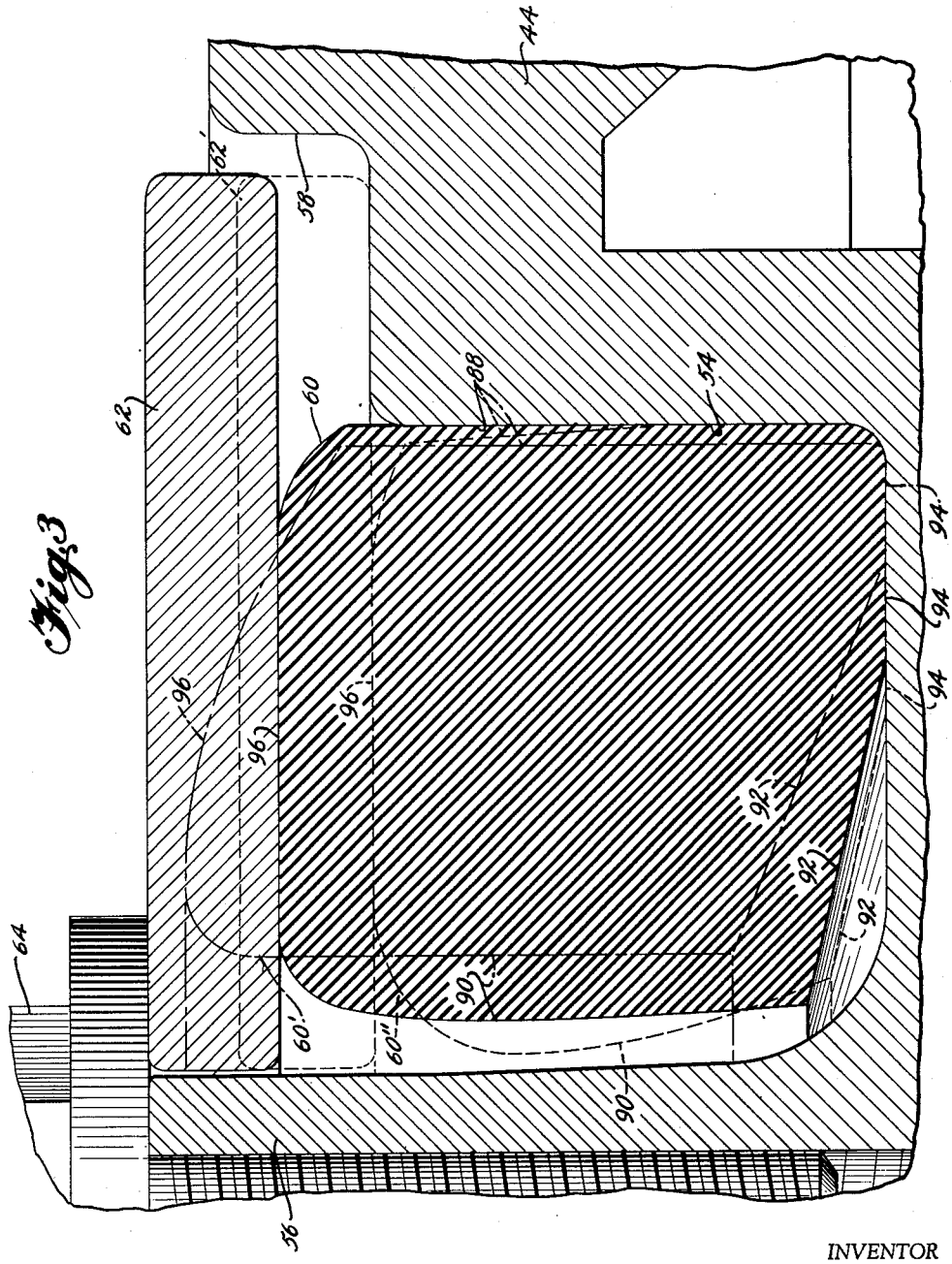

United States Patent Office 3,003,825
Patented Oct. 10, 1961

3,003,825
FLUID PRESSURE CONTROL VALVE MECHANISM
Herbert A. Kemble, Elyria, Ohio, assignor to Bendix-Westinghouse Automotive Air Brake Company, Elyria, Ohio, a corporation of Delaware
Filed May 11, 1959, Ser. No. 812,181
10 Claims. (Cl. 303—54)

This invention relates to fluid pressure control valve mechanisms and more particularly to an improved treadle operated type valve for controlling fluid pressure brake systems.

Fluid pressure brake valves of the treadle operated variety are used almost universally in automotive fluid pressure brake systems and it has heretofore been the general opinion and practice among manufacturers, operators and vehicle drivers that substantial treadle travel with a wide graduating range is desirable for the safe and efficient control of a vehicle. Exhaustive tests, however, have shown that contrary to prior practice and belief, most efficient and desirable brake operation is achieved with only very slight treadle travel with a graduating range being limited generally only to that range of the most frequently used relatively low pressures employed in normal brake operation.

The principal object of the present invention, therefore, is to provide an improved treadle operated brake valve which embodies the concept of minimum treadle travel for delivering any desired brake pressure up to full reservoir pressure while providing graduated control of delivered pressure only in the range most frequently employed for normal conditions.

Still another object of the invention is to achieve the foregoing with a valve structure of relatively short length as compared to prior art valves.

Another object of the invention is to provide a valve incorporating the foregoing desirable features and which includes a novel means for achieving the graduated control in the most frequently employed braking pressure range.

A still more specific object of the invention is to provide a treadle operated brake valve wherein graduated control in the most frequently used pressure range is afforded by a resilient rubber spring member of characteristic shape which produces an apparent braking effect not achieved with metal springs and which resembles in action the effects produced by liquid brakes.

Still another object of the invention is to provide an improved treadle operated brake valve wherein graduated control in the most frequently used pressure range is achieved through the use of a rubber graduating spring with the valve being so constructed and arranged that for pressure ranges greater than normal the operator's foot is enabled to provide directly any desired graduated control with only a very slight movement of the treadle.

A still further object of the invention is to provide in a valve structure of the foregoing nature, novel assembly means which not only facilitates the production assembly of the valve but also the removal and replacement of parts.

Yet another object of the present invention is to provide a means of producing, inexpensively, a novel graduating spring having a variable rate.

Other objects and their attendant advantages will become apparent as the following detailed description is read in conjunction with the accompanying drawings wherein:

FIG. 1 is a vertical cross-sectional view of a valve mechanism constructed in accordance with the present invention;

FIG. 2 is an enlarged cross-sectional view of a resilient graduating member constructed in accordance with the invention;

FIG. 3 is a much-enlarged broken cross-sectional, partly diagrammatical view showing the manner in which the resilient member performs under conditions of use.

Figure 4:
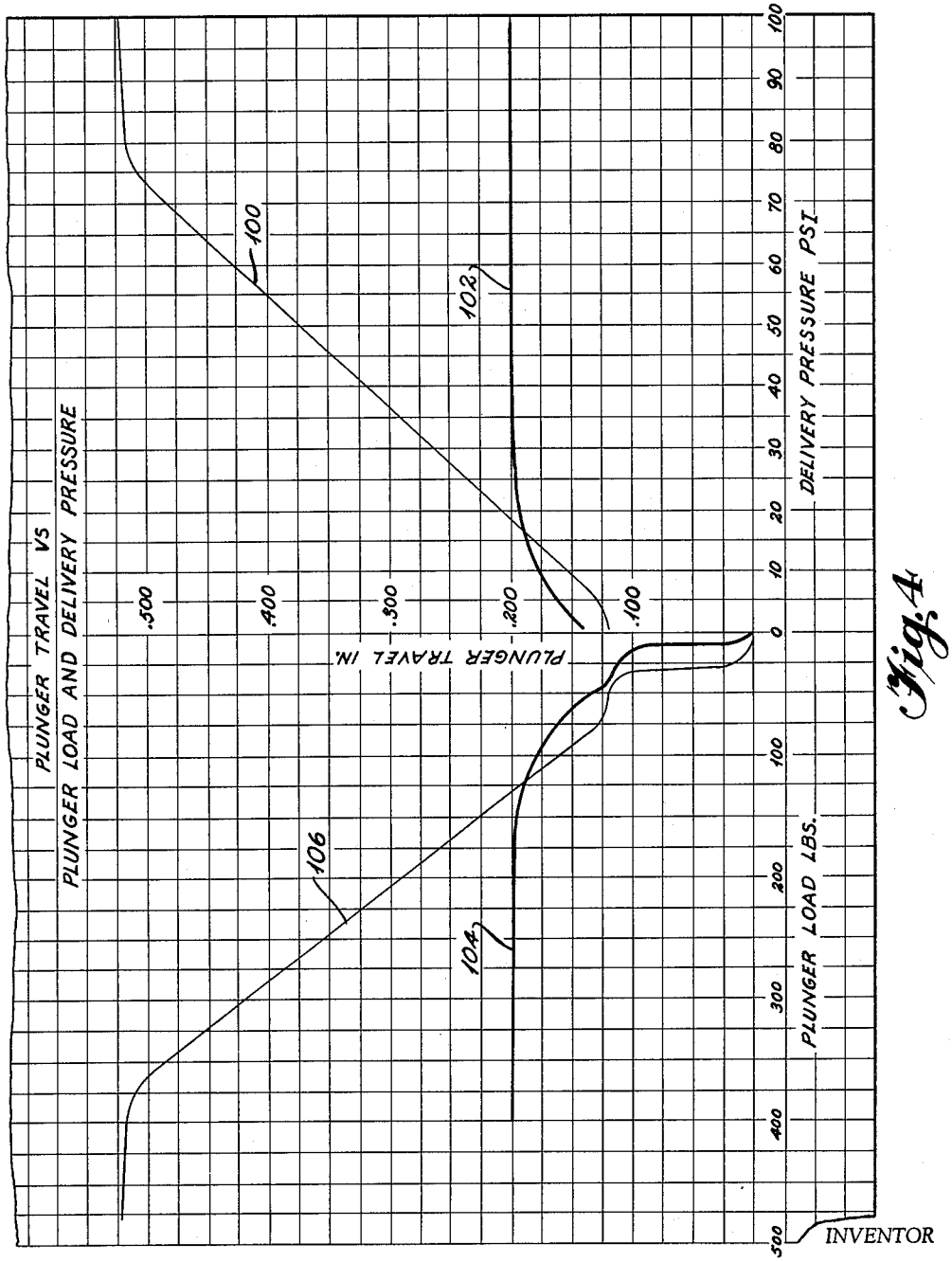
FIG. 4 is a graphical depiction contrasting the operation of the present invention with the operation of certain of the prior art devices.

Referring now to FIG. 1, the invention is disclosed therein as embodying a valve mechanism including a casing 10 which may be connected to a suitable mounting plate 12 in any suitable manner as by a screw 14. The casing is divided into a lower inlet chamber 16 having inlet ports 17 connected to a source of fluid pressure, such as from a compressed air reservoir (not shown), and an upper outlet chamber 18 having outlet ports 19 connected to devices to be actuated such as brake chambers (not shown). The chambers 16, 18 are separated from each other by a partition 20 containing a port 22 whose lower annular edge forms a valve seat for a valve 24 carried on the upper end of a plunger 26 which is provided with an axial exhaust passage 28 therethrough and is slidably received in the bore 30 of a guide member 32 which extends into the inlet chamber 16 and is held in place by a snap ring 34 as shown. The lower end of the bore 30 is at all times connected with atmosphere by way of a grating type port 36 which is normally covered by a flexible dust guard 37. A spring 38 interposed between a shoulder on the guide member 32 and the valve 24 normally retains the latter in sealing engagement with its seat so that the inlet and outlet chambers 16, 18 are normally disconnected from each other. In order that the plunger member 26, carrying the valve 24, and the guide member 32 may be handled as a unit during assembly and disassembly, an upstanding quill-like member 39 of spring material is attached to the member 32 and has a hook-like upper end 40 adapted to engage with a downwardly and outwardly sloping shoulder 41 in the passage 28 of the plunger member 26. The arrangement is such that prior to assembly in the valve body, the spring 38 urges the plunger 26 and guide member 32 apart but the hook 40 of the quill member 39 by engaging the shoulder 41 retains these members together so that they may be inserted as a unit into the body. When the members are to be removed for repair or replacement, the quill member 39 again engages the shoulder 41 so that both of the members are removed as a unit, thus avoiding possible loss of the plunger member 26 after the guide 32 has been removed. When installed the hook is normally out of engagement with the shoulder and serves no additional function.

The upper end of the outlet chamber 18 is enlarged to provide a piston cavity 42 which slidably receives a piston member 44 having an integral downwardly extending plunger portion 46 which is in axial alignment with but normally out of contact with the valve 24 whose upper surface extends annularly inwardly beyond the inner edge of the valve seat so that the valve can be sealingly engaged by the lower annular edge 48 of plunger 46 when it is moved downwardly into engagement with the valve. The piston 44, and hence the plunger, is normally retained in its upper position of the drawing by means of a spring 50 interposed between a piston plunger guide member 52 in chamber 18 and the under side of the piston 44.

In accordance with the invention the upper side of the piston 44 is provided with a central annular cavity or recess 54 which surrounds an upstanding hollow central neck or stem portion 56. The cavity 54 opens onto an enlarged relatively shallow recess 58 and received in the cavity 54 is a resilient spring-like member 60 of rubber or the like more particularly described hereinafter.

Engaging the upper surface of the resilient member 60 is a plate 62 having a central hole for slideably receiving the neck 56 with the latter being interiorly threaded to receive a screw 64 which when screwed downwardly retains the plate 62 in its operative position and serves to preload the rubber spring 60. The plate 62 has a diameter less than that of the shallow recess 58 and has a range of reciprocatory movement equal to the clearance between the underside of the plate 62 and the bottom of the recess 58 for purposes that will become apparent. An assembly retainer plate 65 having inturned prongs 65a engageable with a flange about the upper end of the body 10 overlies the piston 44 to retain it and associated parts in assembled condition when the valve body is removed from the plate 12 and handled as a unit.

The valve mechanism is controlled by a conventional treadle 66 which is pivotally connected to the plate 12 by a bracket 68 carrying a pivot pin 70. The treadle is provided with a roller 72 which is in abutting engagement with the top of a hollow plunger 74 slideably received in an opening 76 in the plate 12. A conventional resilient boot 78 engages annular grooves 80, 82 in the plunger 74 and around the opening 76 respectively. In the position shown in FIG. 1, the treadle is in brake-release position and is urged counterclockwise by the spring 50 so that the left hand end 84 of the treadle engages a suitable bumper 86 of rubber or like material.

The resilient graduating spring 60 has a characteristic shape for purposes fully explained hereinafter and it is illustrated in FIG. 2 in its non-compressed condition as comprising a substantially cylindrical dished annulus having vertical exterior and interior walls 88, 90. The bottom of the spring is planar and is provided with a frusto-conical recess 92 whose base diameter is less than the diameter of the member 60 so that a flat annular surface 94 is provided at the bottom of the spring between the recess 92 and the exterior wall 88. The top annular surface 96 of the member 60 slopes inwardly and upwardly and is preferably curved as shown.

FIG. 3 illustrates by superposed views the spring 60 in its respective pre-assembled, assembled and fully compressed conditions. The dotted line 60' shows the spring in its non-compressed pre-assembled condition and it will be observed that in this condition the spring is of less diameter than the recess 54 so that when it is in its normal assembled pre-loaded condition, indicated by the full lines 60, the spring is expanded, by the compressive force of plate 62, radially inwardly and outwardly so that the exterior wall of the spring snugly engages the wall of the recess 54 but does not expand into the clearance space between the underside of the plate 62 and the bottom of recess 58, and the interior wall 90 of the spring is moved inwardly towards the neck 56.

In operation, with the parts of the valve mechanism in the position of FIG. 1, when the operator depresses the treadle 66, the plunger 74 moves plate 62 downwardly against spring 60 which in turn operates on the bottom of cavity 54 to move the piston 44 and its plunger 46 downwardly against the valve 24 first to close off the exhaust passage 28 and then to open valve 24 so that fluid pressure flows from chamber 16 through the port 22 into chamber 18 and thence through the outlet ports 19 to the brake chambers. Assume that the valve 24 is moved to and held in an open position with the distance between the valve and its seat being less than the distance between the lower surface of the plate 62 and the bottom of recess 58. Under these conditions air pressure flows into outlet chamber 18 until the pressure therein acting on the piston 44 causes this to move upwardly compressing spring 60 until valve 24 closes at which point no further pressure is admitted to chamber 18 and the valve laps with both the inlet port 22 and the exhaust passage 28 closed. Should the operator now depress the treadle a further distance so that the plunger 46 extends into the inlet chamber 16 a greater distance than that between the plate 62 and the bottom of recess 58, air pressure entering the outlet chamber 18 will again exert an upward force against the piston 44 and this will move upwardly to further compress the spring 60 so that it partakes of the form shown in dotted lines at 60" in FIG. 3 and the plate 62 bottoms on the floor of the recess 58 constituting the end of the spring graduating range, so that the valve 24 cannot fully close as a result of the compression of the spring 60. Thus the pressure continues to build up in the outlet chamber 18 and if the operator is exerting the same force on the treadle as when he first moved the treadle the increased distance, the pressure building up in the chamber 19 will cause the operator's foot (unless he elects to exert an increased force on the treadle) to move in a counter-clockwise direction in FIG. 1 until the valve again laps. Should the operator have considered that additional braking force was required, he could, without depressing the pedal any further, merely maintain his foot in one position with an increasing force until he is satisfied that the vehicle is sufficiently decelerated whereupon he could either relax his foot until the pressure in chamber 18 moves his foot sufficiently to cause the valve to lap or he could move his foot independently of the piston and allow the plunger 46 to move clear of valve 24 so as to connect the brake chambers to atmosphere.

From the foregoing description of operation, it will be apparent to those skilled in the art that viewed broadly the operation of the valve is in some respects similar in operation to self-lapping valves of the prior art in which graduation is obtained by the use of metallic springs. The prior art, however, has presumed that desirable brake control is achieved through the use of a treadle having a large range of movement with uniform graduation being provided throughout almost this entire range. Referring to FIG. 4, the graph 100 indicates the prior art concept of the desired relationship between plunger travel and delivery pressure and in FIG. 1 the angle α indicates typically the actual brake treadle travel required to obtain full reservoir delivery pressure with prior art brake valves. In order for the treadle to have this range of movement, which the prior art believed to be desirable, a metallic spring of considerable length with uniform load rate is required so that the brake valve must be relatively quite long. This excessive length is not only disadvantageous because of installation problems but the required brake treadle travel inherent in such a structure is a major cause of driver fatigue and consequent loss of efficiency in the operation of the vehicle.

By exhaustive tests under actual driving conditions, it has been discovered that the disadvantages of excessive valve length and excessive treadle travel can be eliminated by constructing a brake valve in accordance with the present invention. These tests have shown that full vehicle control can be achieved with spring-controlled graduation only in the most frequently used pressure range and that above this range graduation can be controlled directly by the foot of the operator with substantially no treadle travel. Referring again to FIG. 4, the graph 102 illustrates the effects sought and achieved by a specific valve constructed in accordance with the invention.

It will be noted by comparing curves 100 and 102, the resultant characteristics of a valve with a constant rate spring and one with a variable rate. Note the equal intervals of plunger travel for each successive interval of pressure increase throughout the graduating range of the conventional valve as represented by curve 100. Compare this to the successive decrease of plunger travel for each successive pressure interval increase within the graduating range of the valve of this invention as represented by curve 102. In the most frequently used pressure range between 0 and 30 p.s.i., graduation is obtained by the rubber spring with the total movement of the valve plunger in this range not exceeding two-tenths of an inch and the treadle travel typically not exceeding the angle β in FIG. 1. Any movement slightly greater than this causes the plate 62 to bottom on the floor of recess 58, as indicated by the dotted line 62 in FIG. 3, and the valve 24 to be opened as if the spring 60 did not exist. If the valve is retained in this open position, reservoir pressure builds up in the cavity 18 and exerts an increasing upward force on the piston 44 which the driver must resist with an increasing force if the valve is to be maintained open. From his observation of the vehicle's deceleration, the driver can at any time lap the valve by merely relaxing his foot force slightly so that the valve 24 moves to closed position. The actual degree of foot movement is almost undetectable and if further braking force is required, the driver presses down with required additional force which opens the valve 24 with a movement that is again almost undetectable and thereafter he may lap the valve or open the exhaust by merely controlling his foot force with a total movement that is extremely slight, and, in fact, as far as conscious movement is concerned, it can be said that there is substantially none at all so that from the driver's point of view the only effort required is a change in foot force to achieve whatever graduated braking is required in the ranges over and above the normal pressure range. The effect of foot force change with substantially no brake pedal travel is illustrated by graph 104 in FIG. 4 which may be contrasted with the prior art action illustrated by graph 106 where it will be observed that not only is variable foot force required but also the change in foot force must be accompanied by a corresponding change in treadle position which is fatiguing and which tests have determined to be entirely unnecessary and undesirable for complete control of the vehicle.

It should be noted that the valve 24 is of the pressure balanced variety wherein only an annular shoulder is exposed to the full reservoir pressure in the chamber 16. Hence the valve can be moved with comparative ease to its open position whereas prior art valves of the check-valve type have reservoir pressure acting across the entire lower area of the valve tending to move the valve to closed position so that considerably greater force is required to move such valves to open position. Additionally, when the valve of the present invention is lapped, the forces above and below the valve of the present invention are equalized with only a small resultant annular area on the lower face of the valve being exposed to reservoir pressure so that even less force is required to open the lapped valve than is required to open the valve initially with only atmospheric pressure in the space above the valve.

All of the described desired results of the invention can be achieved by the use of a rubber graduating spring which has the advantageous feature of providing the required resiliency for graduated control in the normal pressure range and accomplishes this in a minimum of space. A metallic spring could not readily be constructed to operate in the same space and to produce similar graduating effects, a metallic spring would require very special and prohibitively expensive construction so as to afford a variable rate and operating life similar to that achieved by a rubber spring operating in the same available space.

In accordance with the invention the desired plunger travel versus delivery pressure indicated by graph 102 in FIG. 4 is achieved by determining a spring shape which gives the desired characteristics. It will be apparent that such a shape may vary widely and the resiliency of the rubber may likewise vary but regardless of these factors, the rubber as it is compressed by the plunger must not under any circumstances extrude or flow between or around any of the parts so as to impede, bind, or block relative movement between valve parts. The spring 60 having the shape previously described produces the desired results and with reference again to FIG. 3,
it will be observed that the frusto-conical recess 92 enables the spring to be compressed downwardly with somewhat of a pivotal or cantilever action about the lower surface 94. As the spring is compressed axially downwardly the upper part of the vertical side edge 88 moves radially inwardly away from the wall of cavity 54 while the interior wall 90 of the spring moves toward the neck 56 without however actually engaging the neck when the spring is in its fully compressed condition as indicated by the dotted lines 60''. With the spring material having ample room to move into the annular space surrounding the neck 56 while simultaneously the outer edge 88 is moved away from the cavity side wall, there is no tendency for the spring to bulge outwardly into the space between the plate 62 and the floor of the cavity 58.

From the foregoing description it should be apparent that there has been devised by the present invention a brake valve arranged and constructed to effectuate an entirely new and indeed revolutionary braking concept not contemplated heretofore in the prior fluid pressure braking art. Since braking effort over and above the spring-controlled graduated range is controlled almost exclusively by foot-force with substantially no treadle movement, the braking effect achieved by the valve of the invention closely resembles the effects achieved by liquid brakes and this feature in combination with the other described advantages has met instantaneous driver-acceptance.

It will be apparent to those skilled in the art that the present invention is susceptible of a variety of modifications and changes without, however, departing from the scope and spirit of the appended claims.

What is claimed is:

1. Graduating means for a self-lapping valve mechanism of the type comprising a casing having inlet and outlet chambers, a valve for controlling the flow of fluid pressure between said chambers, a pressure responsive member in said outlet chamber movable in opposite directions to control said valve, and a manually operable device for moving said member in a valve opening direction in opposition to pressure in said outlet chamber tending to move said member in a valve closing direction, said graduating means comprising a substantially cylindrical rubber annulus marginally confined for a portion of its height on said pressure responsive means, said annulus having an inwardly and upwardly sloping upper surface and a planar bottom surface containing a frusto-conical recess therein, and a plate interposed between the upper surface of said member and said manually operable device whereby said rubber member is compressed between said plate and said pressure responsive member when subjected to the opposing forces of said manually operable device and the pressure in said outlet chamber acting on said pressure responsive member.

2. The graduating means of claim 1 wherein means are provided on said pressure responsive member for limiting the compressive movement of said plate with respect to said pressure responsive member.

3. In a self-lapping fluid pressure control valve of the type having inlet and outlet chambers and an exhaust port, a valve for controlling the flow of fluid pressure between said chambers and said exhaust port, a fluid pressure responsive member in said outlet chamber for controlling the movement of said valve in response to manual force acting in one direction on said member and outlet chamber pressure acting in the opposite direction, and a manually operable device for moving said member in a direction to open said valve, graduating means interposed between said manually operable device and said fluid pressure responsive member, said means comprising a rubber annulus having a cylindrical side wall, an upwardly and inwardly sloping upper surface, and a planar lower surface having a frusto-conical recess therein, means on said pressure responsive member for confining the side wall of said annulus for a portion of the height thereof, a flat plate engaging the upper surface of said annulus and having a slideable connection with said pressure responsive member centrally of said annulus, said manually operable device being engageable with said plate for moving said valve to its opened position whereby said annulus is subjected to an axial compressive load causing the same to distort radially inwardly only with no part thereof distorting radially outwardly between said confining means and said plate.

4. In the control valve of claim 3 wherein said plate is normally spaced above but in alignment with said confining means so as to be engageable therewith when the compressive load exceeds a predetermined value, the spacing determining the graduating range of said valve.

5. In the control valve of claim 4 wherein when the compressive load exceeds said predetermined value said valve is moved between open and closed position solely under the control of the operator's foot.

6. Graduating means for a self-lapping valve mechanism of the type comprising a casing having inlet and outlet chambers, a valve for controlling the flow of fluid pressure between said chambers, a pressure responsive member in said outlet chamber movable in opposite directions to control said valve, and a manually operable device for moving said member in a valve opening direction in opposition to pressure in said outlet chamber tending to move said member in a valve closing direction, said graduating means comprising a rubber graduating spring interposed between said manually operable device and said fluid pressure responsive member, and means for supporting said rubber graduating spring in a position to receive an axial compressive load from the opposing forces applied by the manually operable device and the pressure acting on said pressure responsive member in said outlet chamber, said spring comprising a dished cylindrical body of rubber provided with a central opening for receiving rubber distorted by said axial compressive load.

7. Graduating means for a self-lapping valve mechanism of the type comprising a casing having inlet and outlet chambers, a valve for controlling the flow of fluid pressure between said chambers, a pressure responsive member in said outlet chamber movable in opposite directions to control said valve, and a manually operable device for moving said member in a valve opening direction in opposition to pressure in said outlet chamber tending to move said member in a valve closing direction, said graduating means comprising a rubber graduating spring interposed between said manually operable device and said fluid pressure responsive member, and means for supporting said rubber graduating spring in a position to receive an axial compressive load from the opposing forces applied by the manually operable device and the pressure acting on said pressure responsive member in said outlet chamber, said rubber spring being in the form of an annulus having a top surface, a bottom surface and a straight exterior side wall joining said surfaces, said annulus being recessed in a plane normal to its axis whereby when a compressive load is applied thereto rubber distorted by said load occupies the space provided by said recess.

8. Graduating means for self-lapping valve mechanism of the type comprising a casing having inlet and outlet chambers, a valve for controlling the flow of fluid pressure between said chambers, a pressure responsive member in said outlet chamber movable in opposite directions to control said valve, and a manually operable device for moving said member in a valve opening direction in opposition to pressure in said outlet chamber tending to move said member in a valve closing direction, said graduating means comprising a rubber graduating spring interposed between said manually operable device and said fluid pressure responsive member, and means for supporting said rubber graduating spring in a position to receive an axial compressive load from the opposing forces applied by the manually operable device and the pressure acting on said pressure responsive member in said outlet chamber, said spring comprising a substantially cylindrical body of rubber having an axial recess whereby when an axial compressive load is applied to said body rubber distorted by said load occupies space provided by said recess and does not bulge radially outwardly.

9. In a self-lapping fluid pressure control valve of the type having inlet and outlet chambers and an exhaust port, a valve for controlling the flow of fluid pressure between said chambers and said exhaust port, a fluid pressure responsive member in said outlet chamber for controlling the movement of said valve in response to manual force acting in one direction on said member and outlet chamber pressure acting in the opposite direction, and a manually operable device for moving said member in a direction to open said valve, said member being provided with an annular recess, graduating means interposed between said manually operable device and said member, said means comprising a dished rubber annulus positioned in said recess and normally projecting above the upper edge of said recess, a plate engaging the upper surface of said annulus and slideably mounted with respect to said pressure responsive member, said manually operable device being engageable with said plate for moving said valve to its opened position whereby said annulus is subjected to an axial compressive load causing the same to distort radially inwardly only.

10. The control valve of claim 9 which includes in addition, means cooperating with said plate and member for initially preloading said annulus to a predetermined degree.

References Cited in the file of this patent

UNITED STATES PATENTS

| | | |
|---|---|---|
| 1,791,901 | McIntyre | Feb. 10, 1931 |
| 2,850,274 | Villar | Sept. 2, 1958 |
| 2,884,953 | McWilliams | May 5, 1959 |